United States Patent
Filipchuk et al.

(10) Patent No.: US 12,271,700 B2
(45) Date of Patent: Apr. 8, 2025

(54) SYSTEM AND METHOD FOR INTERPRETING STUCTURED AND UNSTRUCTURED CONTENT TO FACILITATE TAILORED TRANSACTIONS

(71) Applicant: JPMorgan Chase Bank, N.A., New York, NY (US)

(72) Inventors: Oleh Filipchuk, London (GB); Richard Lascelles, Woking (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 353 days.

(21) Appl. No.: 17/663,568

(22) Filed: May 16, 2022

(65) Prior Publication Data
US 2023/0367967 A1    Nov. 16, 2023

(51) Int. Cl.
*G06F 16/35*    (2019.01)
*G06F 16/334*   (2025.01)
*G06F 40/30*    (2020.01)

(52) U.S. Cl.
CPC .......... *G06F 40/30* (2020.01); *G06F 16/3344* (2019.01); *G06F 16/35* (2019.01)

(58) Field of Classification Search
CPC ...... G06F 40/30; G06F 16/3344; G06F 16/35; G06F 40/20
See application file for complete search history.

(56) References Cited

U.S. PATENT DOCUMENTS

| | | | |
|---|---|---|---|
| 2011/0202493 A1* | 8/2011 | Li | G06F 3/04883 706/50 |
| 2018/0349482 A1* | 12/2018 | Oliner | G06F 16/38 |
| 2019/0034429 A1* | 1/2019 | Das | G06N 3/08 |
| 2019/0171747 A1* | 6/2019 | Haffner | G06F 40/205 |
| 2020/0005117 A1* | 1/2020 | Yuan | G06F 40/35 |
| 2020/0210499 A1* | 7/2020 | Huang | G06F 16/958 |
| 2020/0272919 A1* | 8/2020 | Haimson | G16H 50/20 |
| 2021/0306200 A1* | 9/2021 | Tee | H04L 41/0631 |
| 2021/0342785 A1* | 11/2021 | Mann | G06F 40/186 |
| 2022/0108074 A1* | 4/2022 | Kehler | G06F 18/22 |
| 2022/0358906 A1* | 11/2022 | Roitman | G06F 40/30 |

(Continued)

FOREIGN PATENT DOCUMENTS

| | | | | |
|---|---|---|---|---|
| CN | 112398900 A | * | 2/2021 | ............ G06N 20/00 |
| CN | 114223185 A | * | 3/2022 | ............ G06F 40/30 |
| CN | 114912015 A | * | 8/2022 | ............ G06N 3/045 |

(Continued)

*Primary Examiner* — Paras D Shah
*Assistant Examiner* — Mulugeta Tuji Dugda
(74) *Attorney, Agent, or Firm* — GREENBLUM & BERNSTEIN, P.L.C.

(57) ABSTRACT

A method for interpreting structured and unstructured content to facilitate tailored transactions is provided. The method includes acquiring, from one or more unstructured data sources, unstructured data, and acquiring, from one or more structured data sources, structured data. The method further includes performing natural language processing (NLP) on both the structured data and the unstructured data using a machine learning algorithm, and generating, via the machine learning algorithm, an NLP response based on the NLP. Based on the NLP response, the method further performs identifying at least one candidate object, and generating a list of actions corresponding to the candidate object.

20 Claims, 7 Drawing Sheets

(56) References Cited

U.S. PATENT DOCUMENTS

2023/0145463 A1* 5/2023 Bayomi ................ G06F 16/345
                                                       715/254
2024/0134665 A1* 4/2024 Kang ..................... G06F 9/455

FOREIGN PATENT DOCUMENTS

| CN | 110188047 B | * | 4/2023 | .......... G06F 11/3692 |
| DE | 69838443 T2 | * | 6/2008 | ............ H04L 29/06 |
| WO | WO-2018039264 A1 | * | 3/2018 | ........... G06F 16/144 |
| WO | WO-2022203783 A1 | * | 9/2022 | ............. G06F 40/20 |

* cited by examiner

SYSTEM AND METHOD FOR INTERPRETING STUCTURED AND UNSTRUCTURED CONTENT TO FACILITATE TAILORED TRANSACTIONS

TECHNICAL FIELD

This disclosure generally relates to a system and method for interpreting information from various sources, including both structured and unstructured content, to provide contextualized options and information, and to generate a new idea path for entry into a system.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, with the advancement of technology and vast disbursement of information, various personnel in an organization may face sensory overload and overabundance of information that may be available. Even with the growing amount of structured data being captured and compiled in the organizations, there also may be a large amount of unstructured data generated via various communication channels and other sources, which may not be formally processed as structured data for further processing. Accordingly, information provided by only the structured data may often provide an incomplete view.

SUMMARY

According to an aspect of the present disclosure, a method for interpreting structured and unstructured content to facilitate tailored transactions using a context tool is provided. The method includes acquiring, by a processor and from one or more unstructured data sources, unstructured data; acquiring, by the processor and from one or more structured data sources, structured data; performing, by the processor, natural language processing (NLP) on both the structured data and the unstructured data using a machine learning algorithm; generating, by the machine learning algorithm executed by the processor, an NLP response based on the natural language processing; identifying, by the processor, at least one candidate object based on the generated NLP response; and generating, by the processor, a list of actions corresponding to the candidate object.

According to another aspect of the present disclosure, the method further includes applying, by the processor, the machine learning algorithm to the unstructured data to separate out relevant information and irrelevant information; discarding, by the processor, the irrelevant information; classifying, by the machine learning algorithm executed by the processor, the unstructured data; selecting a machine learning model, among a plurality of machine learning models, to apply to the classified data based on a context of the classified data; and applying the selected learning model to the classified data, in which the candidate object is identified using the selected machine learning model.

According to another aspect of the present disclosure, the method further includes executing, by the processor, an interoperability processing for providing information corresponding to the candidate object on a different application; and generating, by the processor and based on information related to the at least one candidate object and metadata provided by the different application, a new idea path for storage in a memory.

According to yet another aspect of the present disclosure, when a plurality of candidate objects are identified, the method further includes performing one or more data services to narrow the plurality of candidate objects to a single candidate object.

According to another aspect of the present disclosure, the one or more data services include at least one of a search operation and a validation operation.

According to a further aspect of the present disclosure, when a plurality of candidate objects are identified, the method further includes narrowing the plurality of candidate objects to a single candidate object based on an interaction with a user.

According to yet another aspect of the present disclosure, the method further includes performing parsing of the unstructured data to convert strings of data from its original format to a uniform format.

According to a further aspect of the present disclosure, the unstructured data sources includes at least one of a system clipboard, a chat bot, a fast field, and a cloud-based data input.

According to another aspect of the present disclosure, the method further includes validating, by the processor, the structured data based on size and type.

According to a further aspect of the present disclosure, the method further includes displaying, on a display, the list of actions corresponding to the candidate object for selection; and displaying, on the display, information corresponding to the candidate object.

According to a further aspect of the present disclosure, the method further includes receiving, by the processor and via a peripheral device, at least one user input; and updating at least one of the list of actions or the information corresponding to the candidate object based on the at least one user input received.

According to a further aspect of the present disclosure, the method further includes receiving, by the processor, a user selection of an action to be performed from the generated list of actions corresponding to the candidate object; and executing, by the processor, the selected action.

According to a further aspect of the present disclosure, the method further includes determining, by the processor, an amount of user interactions conducted with the user before the user selection of the action is received; and providing, by the machine learning algorithm executed by the processor, feedback on an accuracy of the natural language processing (NLP) based on the amount of user interactions conducted.

According to a further aspect of the present disclosure, the method further includes updating, by the processor, the machine learning algorithm utilized in performing the NLP based on the provided feedback.

According to another aspect of the present disclosure, the method further includes updating, by the processor, at least one machine learning model based on the provided feedback.

According to another aspect of the present disclosure, the method further includes the NLP is performed locally on a client device.

According to another aspect of the present disclosure, the NLP is remotely performed over a cloud network.

According to another aspect of the present disclosure, the list of actions includes at least one of an inquiry action, an execution action, and a request for quote.

According to another aspect of the present disclosure, a system includes a processor, a memory and a communication circuit. The processor is configured to acquire, from one or more unstructured data sources, unstructured data; acquire, from one or more structured data sources, structured data; perform NLP on both the structured data and the unstructured data using a machine learning algorithm; cause to generate, using the machine learning algorithm, an NLP response based on the natural language processing; identify at least one candidate object based on the generated NLP response; and generate a list of actions corresponding to the candidate object.

According to another aspect of the present disclosure, a non-transitory computer readable storage medium that stores a computer program for interpreting structured and unstructured content to facilitate tailored transactions is disclosed. The computer program, when executed by a processor, causing a system to perform a process including acquiring, from one or more unstructured data sources, unstructured data; acquiring, from one or more structured data sources, structured data; performing NLP on both the structured data and the unstructured data using a machine learning algorithm; causing to generate, using the machine learning algorithm, an NLP response based on the natural language processing; identifying at least one candidate object based on the generated NLP response; and generating a list of actions corresponding to the candidate object.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
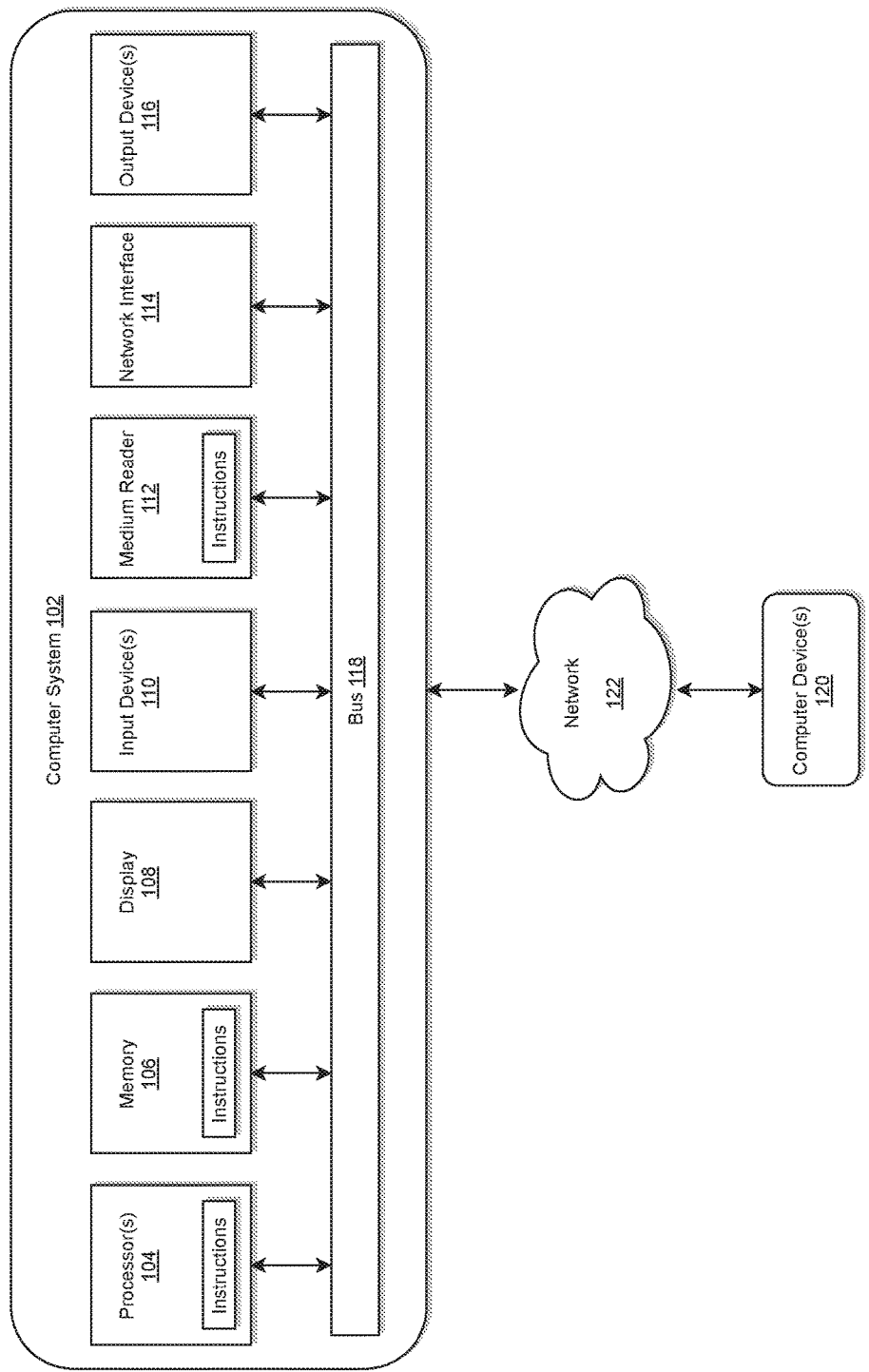
FIG. 1 illustrates a computer system for implementing a context tool system in accordance with an exemplary embodiment.

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a context tool system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art would appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art would appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art would appreciate that additional networks 122 which are known and understood may additionally or alternatively be used and that the exemplary networks 122 are not limiting or exhaustive. Also, while the network 122 is shown in FIG. 1 as a wireless network, those skilled in the art would appreciate that the network 122 may also be a wired network.

The computer device 120 is shown in FIG. 1 as a one or more computer devices. However, those skilled in the art would appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art would appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art would appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
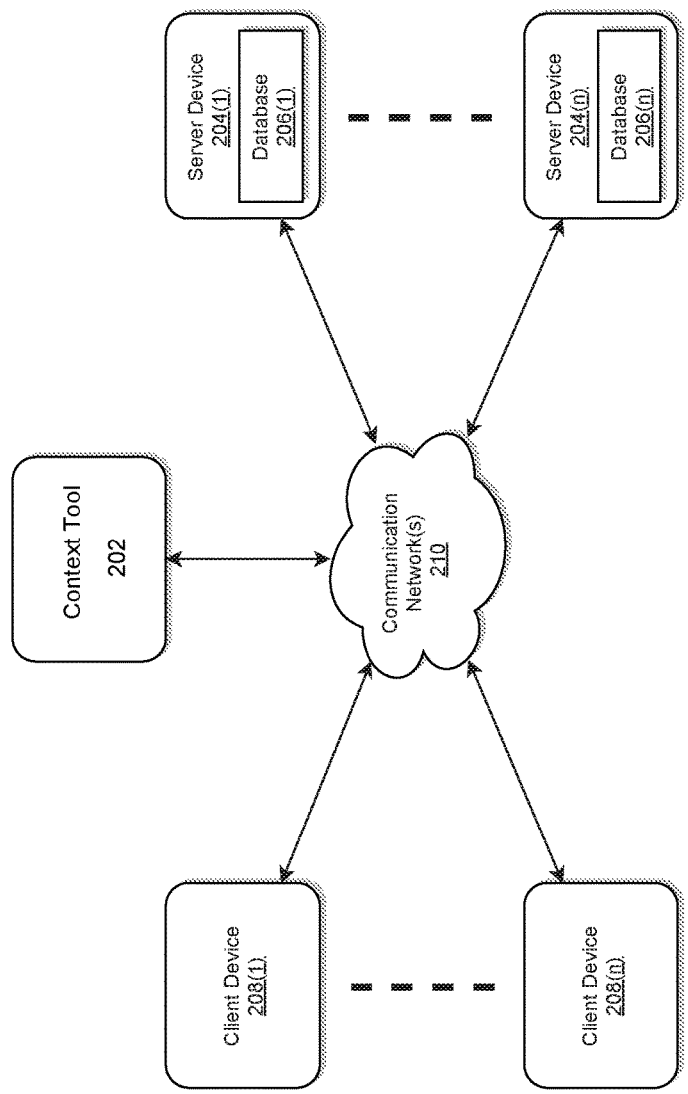
FIG. 2 illustrates an exemplary diagram of a network environment with a cloud native context tool system in accordance with an exemplary embodiment.

FIG. 2 illustrates an exemplary diagram of a network environment with a cloud native context tool system in accordance with an exemplary embodiment.

The context tool system 202 may be the same or similar to the computer system 102 as described with respect to FIG. 1.

The context tool system 202 may store one or more applications that can include executable instructions that, when executed by the context tool system 202, cause the context tool system 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the context tool system 202 itself, may be located in virtual server(s) running in a cloud-based computing environment rather than being tied to one or more specific physical network computing devices. Also, the application(s) may be running in one or more virtual machines (VMs) executing on the context tool system 202. Additionally, in one or more embodiments of this technology, VM(s) running on the context tool system 202 may be managed or supervised by a hypervisor.

In the network environment 200 of FIG. 2, the context tool system 202 is coupled to a plurality of server devices 204(1)-204(n) that hosts a plurality of databases 206(1)-206(n), and also to a plurality of client devices 208(1)-208(n) via communication network(s) 210. A communication interface of the context tool system 202, such as the network interface 114 of the computer system 102 of FIG. 1, operatively couples and communicates between the context tool system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the context tool system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The context tool system 202 may be a standalone device or integrated with one or more other devices or apparatuses, such as one or more of the server devices 204(1)-204(n), for example. In one particular example, the context tool system 202 may be hosted by one of the server devices 204(1)-204(n), and other arrangements are also possible. Moreover, one or more of the devices of the context tool system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the context tool system 202 via the communication network(s) 210 according to the HTTP-based protocol and/or JavaScript Object Notation (JSON) protocol, for example, although other protocols may also be used. According to a further aspect of the present disclosure, wherein the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n).

Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the context tool system 202 that may efficiently provide a platform for implementing a cloud native context tool module, but the disclosure is not limited thereto.

The client devices 208(1)-208(n) may run interface applications, such as standard web browsers or standalone client applications, which may provide an interface to communicate with the context tool system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the context tool system 202, the server devices 204(1)-204 (n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the context tool system 202, the server devices 204(1)-204(n), or the client devices 208(1)-208(n), for example, may be configured to operate as virtual instances on the same physical machine. For example, one or more of the context tool system 202, the server devices 204(1)-204(n), or the client devices 208(1)-208(n) may operate on the same physical device rather than as separate devices communicating through communication network(s) 210. Additionally, there may be more or fewer context tool systems 202, server devices 204(1)-204(n), or client devices 208(1)-208(n) than illustrated in FIG. 2. According to exemplary embodiments, the context tool system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
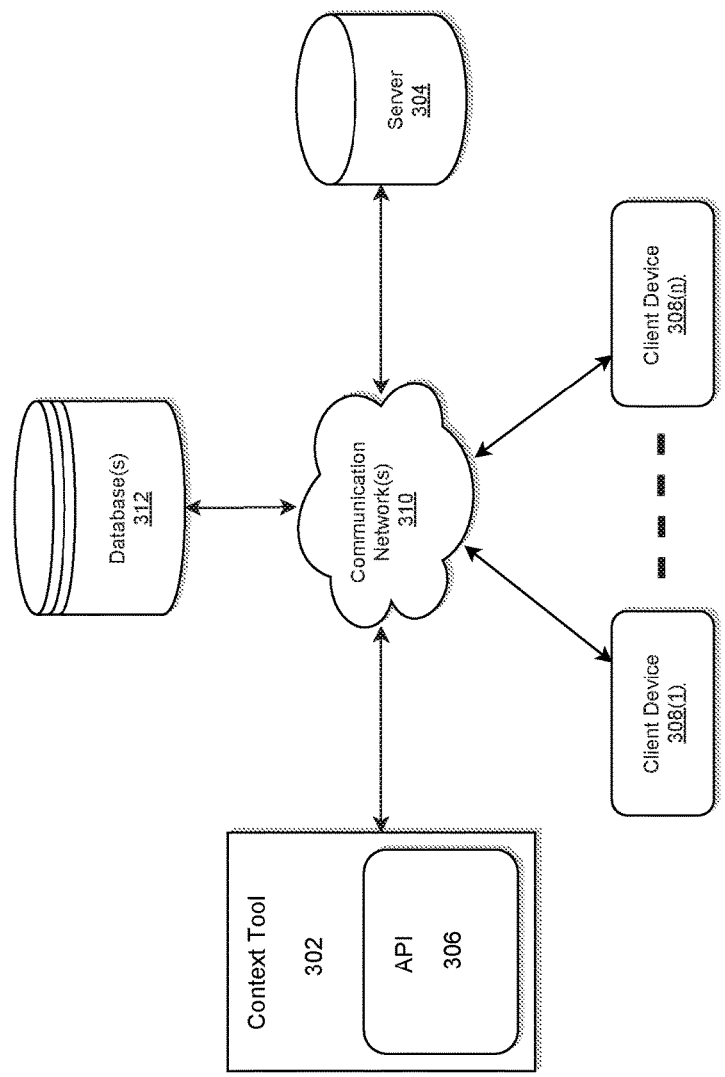
FIG. 3 illustrates a system diagram for implementing a cloud native context tool system in accordance with an exemplary embodiment.

FIG. 3 illustrates a system diagram for implementing a cloud native context tool system in accordance with an exemplary embodiment.

As illustrated in FIG. 3, the system 300 may include a context tool system 302 within which a group of API modules 306 is embedded, a server 304, a database(s) 312, a plurality of client devices 308(1) . . . 308(n), and a communication network 310.

According to exemplary embodiments, the context tool system 302 including the API modules 306 may be connected to the server 304, and the database(s) 312 via the communication network 310. Although there is only one database has been illustrated, the disclosure is not limited thereto. Any number of databases may be utilized. The context tool System 302 may also be connected to the plurality of client devices 308(1) . . . 308(n) via the communication network 310, but the disclosure is not limited thereto.

According to exemplary embodiment, the context tool system 302 is described and shown in FIG. 3 as including the API modules 306, although it may include other rules, policies, modules, databases, or applications, for example. According to exemplary embodiments, the database(s) 312 may be embedded within the context tool system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data from the plurality of client devices 308(1) . . . 308(n) via the communication network 310.

The API modules 306 may be configured to implement a user interface (UI) platform that is configured to enable context tool as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the context tool system 302. In this regard, the plurality of client devices 308(1) . . . 308(n) may be "clients" of the context tool system 302 and are described herein as such. Nevertheless, it is to be known and understood that the plurality of client devices 308(1) . . . 308(n) need not necessarily be "clients" of the context tool system 302, or any entity described in association therewith herein. Any additional or alternative relationship may exist between either or both of the plurality of client devices 308(1) . . . 308(n) and the context tool system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the context tool system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The context tool system 302 may be the same or similar to the context tool system 202 as described with respect to FIG. 2, including any features or combination of features described with respect thereto.

Figure 4:
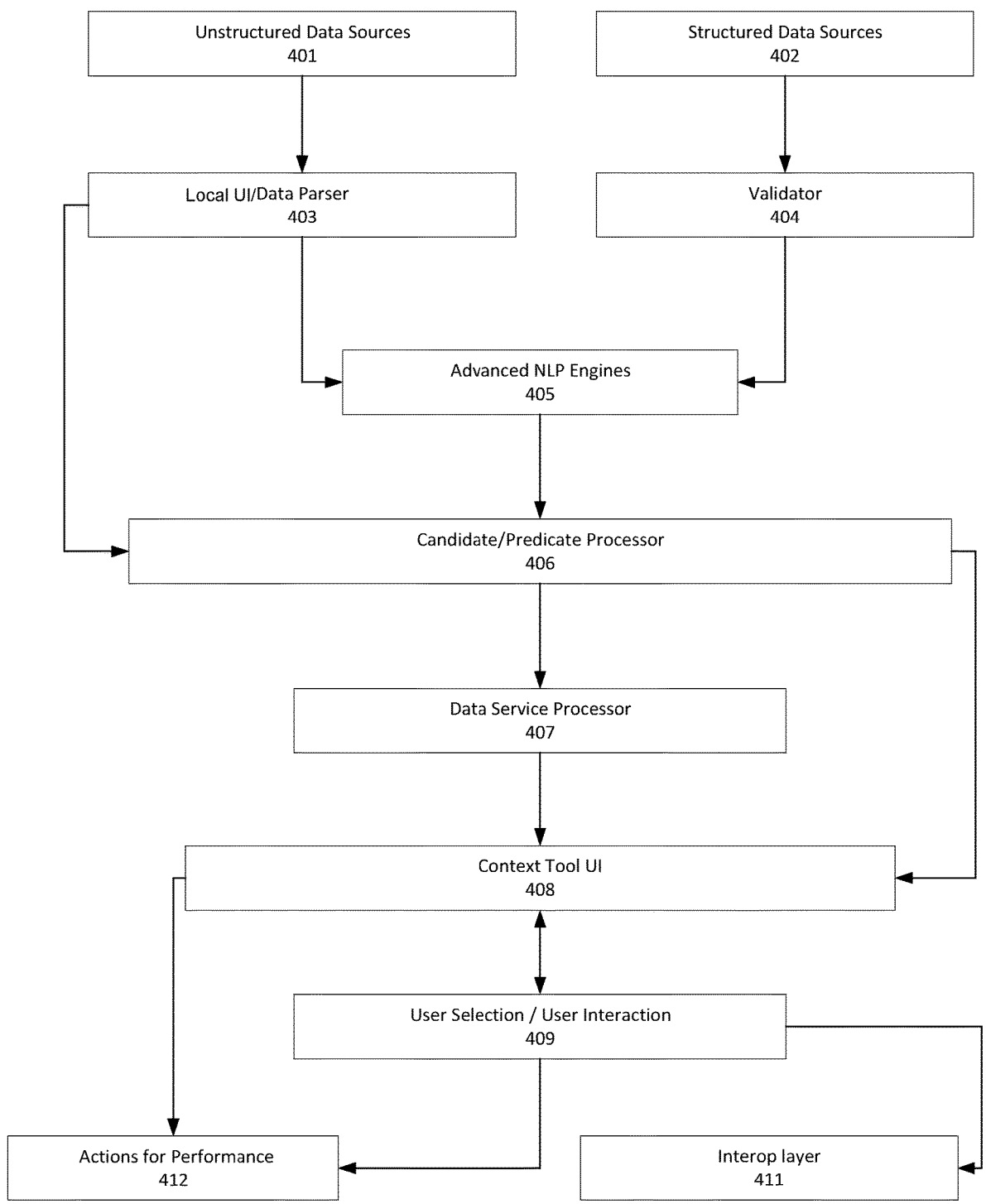
FIG. 4 illustrates a high level architecture flow of a context tool system in accordance with an exemplary embodiment.

FIG. 4 illustrates a high level architecture flow of a context tool system in accordance with an exemplary embodiment.

According to aspects of the present disclosure, a context tool system may interact with various data input sources, both structured and unstructured, external applications, and users themselves to provide a user tailored actions for selection or performance, and generate a new idea path. The context tool system may include, without limitation, a local UI/data parser 403, a validator 404, advanced NLP (natural language processing) engines 405, a candidate/predicate processor 406, a data service processor 407, a context tool UI (user interface) 408, and an interop layer or processor 411. The context tool may receive its input from various sources, including unstructured data sources 401, and structured data sources 402. Further, the context tool may interact with a user input provided by a user, such as user selection/user interaction 409, and may output actions for performance 412 for execution by a processor. In an example, one or more of the components of the context tool may be implemented by at least one processor or integrated circuit.

The unstructured data sources 401 may include system clipboard, chat bots, fast field, a cloud-based data input, and the like. In an example, unstructured data may include text in a form of a written conversation between multiple parties in a chat or messaging application. However, aspects of the present disclosure are not limited thereto, such that the unstructured text may additionally include verbal conversations that may be automatically transcribed in a text form. The unstructured data sources 401 may feed unstructured data to the local UI/data parser 403 for further processing.

The local UI/data parser 403 may for example, include to a data converter, a local UI, a crawler/bot or the like. The local UI/data parser 403 may process the received data from various unstructured data sources and convert the strings of data from its original format to a uniform format for further processing. In a case of web scraping, a crawler may scrape web data to identify relevant datasets. The unstructured data may be categorized based on certain words, and extraneous terms may be removed from further processing. The parsed text information may be parsed or formatted to be inputted to the advanced NLP engines 405 for further processing.

Alternatively, the unstructured data may be tokenized to be transmitted to the candidate/predicate processor 406. In an example, tokenization of data may refer to breaking down of text into smaller semantic units or single clauses. For example, tokenization may split a phrase, sentence, paragraph or event an entire text dialogue/document into smaller units, such as individual words, terms, characters or subwords (part of a word). Each of these smaller units may be referred to as tokens, which may form building blocks of natural language. The unstructured data may, for example, be tokenized based on semantic lines including at least information based on an instrument and economics. The unstructured may also be exemplarily tokenized based on information on strategy, root economics, client contact, client account and original input.

The structured data sources 402 include formulaic inputs, which may be provided in a single line of text, or as tabular data in a form of a spreadsheet. In an example, the structured data may be provided in parallel with the unstructured data or independently from the unstructured data. The structured data sources 402 provides structured data to the validator 404.

The validator 404 may perform validation on the structured data received from the structured data sources 402. In an example, the validations performed by the validator 404 may include, without limitation, a validation of file type, file size and other attributes. Validations maybe performed on the structured data to ensure the structured data have been loaded/acquired properly, and to ensure that data is accurate before further analysis or processing is performed on the data. The structured data may then be encoded to, for example, represent binary data in an ASCII string format. Further, the initially validated structured data may be processed to generate file content in the structured data in Base64. The processed structured data is then sent to the advanced NLP engines 405.

In an example, the advanced NLP engines 405 may determine, which downstream engine to route a full data set (e.g., acquired and processed unstructured and structured data) to for final evaluation. In an example, the advance NLP engines 405 may utilize machine learning and/or artificial intelligence engines or algorithms to improve contextualization of the aggregated acquired data, regardless of source of individual data. Based on the contextualization, the NLP engines 405 may determine a context or subject of the all of the acquired data, and accordingly, routes for further processing based on the determination. In other words, downstream workflows may be dictated by the NLP engines 405. The NLP engines 405 generates an NLP response, which is then tokenized and transmitted to the contextual tool UI 408.

According to exemplary aspects, the NLP may refer to a field in machine learning with an ability of a computer to understand, analyze, and manipulate written text information. More specifically, machine learning for natural language processing may involve use of machine learning (ML) algorithms and/or artificial intelligence (AI) to understand context or meaning of the acquired/processed text. Accordingly, the advanced NLP engines may utilize machine learning and/or artificial intelligence to interpret written language based on pattern recognition.

In an example, the machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

Machine learning or artificial intelligence may use training models such as, for example, a machine learning model which is generated to be further trained on additional data. Accuracy of output may be increased with respect to time as additional data is obtained and utilized to update the machine learning model. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

The candidate/predicate processor 406, based on the NLP response provided by the advanced NLP engines 405, performs candidate or predicate processing. If the candidate/predicate processor 406 determines that there is a candidate match based on the NLP response, the identified candidate object and corresponding attributes or metadata may be transmitted to the context tool UI 408. In an example, the identified candidate object may be indicated as a validated entity, which may be for example, be an amount, direction, level, term, and/or strategy. However, aspects of the present disclosure are not limited thereto, such that the candidate object may be identified as a valid entity based on other attributes or data fields. Accordingly, an evaluation result of the aggregated data collected from various sources, both structured and unstructured, is returned to the user with metadata indicating the nature of the evaluation result via the context tool UI 408.

If no exact match is determined, various searches and queries may be performed to identify potential candidates. For example, a query may be performed for a client contact or a client account. In another example, an instrument search may be performed based on a name/ticker of candidate instruments, and at least one of information on coupon, maturity day, maturity month, maturity year, series, coupon type, perpetual bonds, currency, or the like. Further, an instrument search may be performed based on an ID of the instrument and other corresponding information. The corresponding information may be specified in a random order or a specified order. In an example, the specified order may include an international securities identification number (ISIN), committee on uniform securities identification procedure (cusip), Bloomberg global identifier (bbgID), alias and the like. However, aspects of the present disclosure are not limited thereto, such that potential candidates may be identified based on other queries, searches or attributes.

Based on the candidate/predicate processing performed by the candidate/predicate processor 406, the potential candidates may be transmitted to the data service processor 407.

In an example, the data service processor 407 may perform one or more data services for the potential candidates. For example, data services may include a search operation, validation, and the like. The data service processor 407 based on the data services performed may provide a validated entity to the context tool UI 408. Data service processor 407 may additionally illicit an input by a user. For example, the data service may provide a list of potential candidates for selection by the user. The validated entity may be validated in terms of one or more attributes, such as instrument, contact, and/or account. The validated entity may additionally include metadata indicating whether an entity has only one match or it's a user selected match, origin of the data (e.g., clipboard, fast field, file, etc.), and original input (either text or file name). Accordingly, an evaluation result of the aggregated data collected from various sources, both structured and unstructured, is returned to the user with metadata indicating the nature of the evaluation result via the context tool UI 408.

The context tool UI 408, in response to receiving the validated entity or candidate, displays information corresponding to the validated entity or candidate provided by either of the data service processor 407 or the candidate/predicate processor 406. In an example, the context tool UI 408 may present a list of actions for performance 412 with respect to the validated entity or candidate. Accordingly, rather than being presented with a large list of potential actions that may be performed for selection, where many will be irrelevant to the user, a more targeted list of actions available for selection by the user may be presented. Upon selection of an action by the user among the list of actions for performance 412, a processor may execute the selected action. In an example, the list of actions for selection may include, without limitation, an inquiry type action, an execution type action, a request for quote (RFQ) type of action, which may specify order details and/or interest in the validated entity or candidate. Further, actions or data fields that may be incompatible with the validated entity or candidate may not be presented to the user. Accordingly, memory utilization may be improved by allocating memory for field values that may be relevant to the validated entity or candidate.

Further, the context tool UI 408 may receive user selection/user interaction 409 information for updating information and/or options/actions provided on the context tool UI 408. For example, the context tool UI 408 may monitor and capture user actions or selections with other applications on a terminal operated by the user. The context tool UI 408 may also capture user actions or selections with respect to the context tool UI 408. Based on the monitored or captured user actions or selections, the context tool UI 408 may provide a more refined set of information or options/actions for user selection and execution by the context tool.

Moreover, upon receiving information pertaining to the user selection/user interaction 409, one or more of the actions for performance 412 corresponding to the user selection or input may be performed. In an example, the user selection/user interaction 409 may provide payload of at least one of an inquiry, an instrument, or a contact, for performing one or more of the actions for performance 412.

Figure 7:
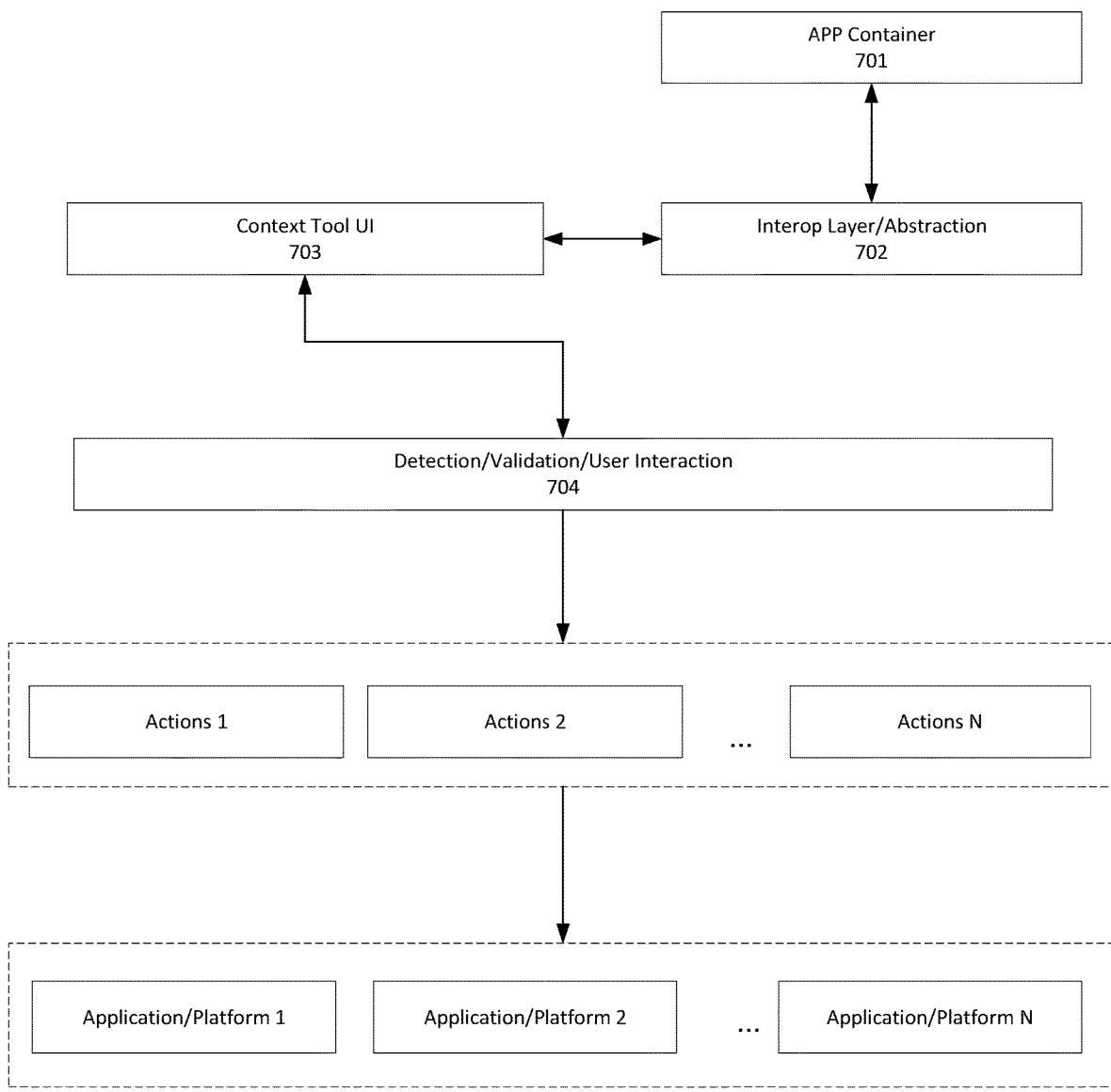
FIG. 7 illustrates an interop process flow in accordance with an exemplary embodiment.

Additionally, the user selection/user interaction 409 information may be transmitted to Interop layer or processor 411. In an example, the user selection/user interaction 409 information may provide payload of at least one of an inquiry, instrument, or a contact, to the interop layer or processor 411. More specifically, the interop layer or processor 411 may execute a FDC3 standard protocol, such that the context tool communicates with other applications on the user's desktop to provide contextually relevant information discovered as a result of evaluation of the original input. Based on the outputs provided by the context tool and/or based on interaction with other application(s), a new idea path may be generated based on aggregated information from various sources. Details of the Interop flow is exemplarily described in more detail in FIG. 7 provided below.

Figure 5:
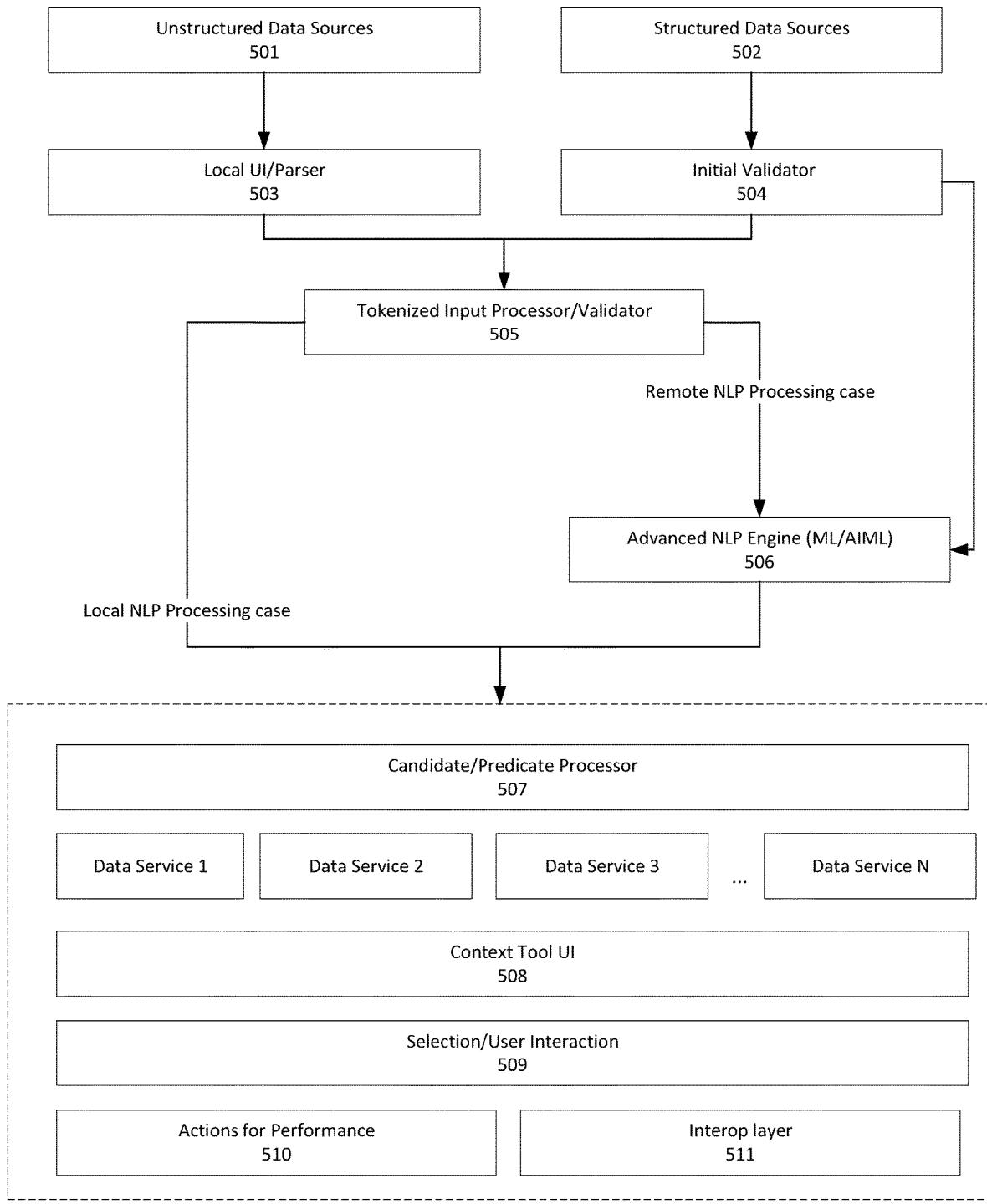
FIG. 5 illustrates a process flow for performing local and remote NLP in accordance with an exemplary embodiment.

FIG. 5 illustrates a process flow for performing local NLP processing and remote NLP processing in accordance with an exemplary embodiment.

Unstructured data sources 501 may provide unstructured data to a local UI/Parser 503 for processing. The unstructured data may include text in a form of a written conversation between multiple parties in a chat or messaging application. The unstructured data sources may include, without limitation, system clipboard, chat bots, fast field, a cloud-based data input, and the like. However, aspects of the present disclosure are not limited thereto, such that the unstructured text may additionally include verbal conversations that may be automatically transcribed in text form.

The local UI/data parser 503 may for example, include to a data converter, a local UI, a crawler/bot or the like. The local UI/data parser 503 may process the received data from various unstructured data sources and convert the strings of data from its original format to a uniform format for further processing. In a case of web scraping, a crawler may scrape web data to identify relevant datasets. The unstructured data may be categorized based on certain words, and extraneous terms may be removed from further processing. The parsed text information may be parsed and/or tokenized to be inputted a tokenized input processor/validator 505.

In an example, tokenization of data may refer to breaking down of text into smaller semantic units or single clauses. According to exemplary aspects, tokenization may split a phrase, sentence, paragraph or event an entire text dialogue/document into smaller units, such as individual words, terms, characters or subwords (part of a word). Each of these smaller units may be referred to as tokens, which are building blocks of natural language.

Structured data source 502 may provide structured data to an initial validator 504. In an example, the structured data may be provided in parallel with the unstructured data or independently from the unstructured data. In an example, the structured data may include, without limitation, formulaic inputs, which may be provided in a single line of text, or as tabular data in a form of a spreadsheet.

The initial validator 504, upon receipt of the structured data, may perform one or more initial validations. In an example, the initial validations may include, without limitation, a validation of file type, file size and other attributes that may be quickly validated. Initial file validation maybe performed on the structured data to ensure the structured data have been loaded/acquired properly, and to ensure that data is accurate before further analysis or processing is performed on the data. The structured data may then encoded to, for example, represent binary data in an ASCII string format. Further, the initially validated structured data may be processed to generate file content in the structured data in Base64. The processed structured data is then sent to the tokenized input processor/validator 505.

The tokenized input processor/validator 505 inputs metadata into the tokenized/validated data received. Further, the tokenized input processor/validator 505 determines whether the modified data is a local NLP processing case or a remote NLP processing case. In an example, the local NLP processing case may perform NLP processing on a local terminal. In contrast, remote NLP processing case may perform NLP processing over a network, such as on a cloud network.

In an exemplary local NLP case, only one financial instrument ID may be specified, and only one financial instrument name (multi parts) may be specified. Further, all words provided may be part of the financial instrument ID or part of the financial instrument name. Although financial instrument is used as an example in the above noted disclosure, aspects of the present disclosure are not limited thereto, such that product ID and product name may be specified. The input provided by the tokenized input processor/validator 505 in the local NLP processing case may be provided on multiple lines.

Further, in the local NLP case, the specified information is inputted to a candidate/predicate processor 507 of the context tool.

In an exemplary remote NLP case, additional data validations may be performed by the tokenized input processor/validator 505 prior to data transmission to the candidate/predicate processor 507. According to aspects of the present disclosure, text size may be validated and for a particular format (e.g., text, no SQL, less than 50 lines may be specified). Further, various input field values may be required. For example, at least one set of field values may be inputted, or another set of field values may be provided. Further, more words than candidates may be required (i.e., in addition to extracted entities, there is additional text present).

The information specified in the remote NLP case are then provided to an advanced NLP engine 506 for contextual analysis. In an example, natural language processing may refer to a subfield of artificial intelligence. Natural language processing allows machines to process and contextualize and/or classify human text language. More specifically, natural language processing separates written text acquired into fragments, such that grammatical structure of sentences and meaning of words may be analyzed and understood in context. Such processing allows computers to read and understand written text. Further, natural language processing may perform one or more pre-processing operations for more effective output, such as tokenization, stemming and lemmatization, and filtering out extraneous words that provide little to no value.

Further, the advance NLP engine 506 may utilize machine learning and/or artificial intelligence algorithms to improve contextualization of the aggregated acquired data, regardless of source of individual data.

Upon execution of the NLP by the advance NLP engine 506, an NLP response or output is generated and tokenized as input, and provided to the candidate/predicate processor 507. The tokenized input is then transmitted to the context tool to provide a customized display of information. For example, the context tool may provide a customized list of actions available (e.g., five actions from a list of fifty that may be available) for selection to a respective user based on the unstructured and structured data corresponding to the respective user. Further, the context tool may additional provide a customized set of data services available to the respective users. In an example, certain data services may be provided automatically as a default, whereas other data services may be selected from a customized list. The customized list may include less items for selection that all available items.

The candidate/predicate processor 507 of the context tool may receive the tokenized input from the advance NLP engines 506 (in the remote NLP processing case) or the tokenized input from the tokenized input processor/validator 505 (in the local NLP processing case) for additional processing.

More specifically, the candidate/predicate processor 507 determines that there is a candidate match in the local NLP processing case, the identified candidate and corresponding attributes or metadata may be transmitted to the context tool UI 508 without additional data servicing. Accordingly, an evaluation result of the aggregated data collected from various sources, both structured and unstructured, may be returned to the user with metadata indicating the nature of the evaluation result via the context tool UI 508.

If no exact match is determined by the candidate/predicate processor 507, various searches and queries may be performed to identify potential candidates using one or more data services, including Data Service 1, Data Service 2, Data Service 3 and up to Data Service N, in which N is an integer. For example, data services may include a search operation, validation, and the like. The one or more data services conducted may result in a validated entity, which may be provided to the context tool UI 508. Data services may additionally illicit an input by a user. For example, the data service may provide a list of potential candidates for selection by the user. The validated entity may be validated in terms of one or more attributes, such as instrument, contact, and/or account. The validated entity may additionally include metadata indicating whether an entity has only one match or it's a user selected match, origin of the data (e.g., clipboard, fast field, file, etc.), and original input (either text or file name). Accordingly, an evaluation result of the aggregated data collected from various sources, both structured and unstructured, is returned to the user with metadata indicating the nature of the evaluation result via the context tool UI 508.

The context tool UI 508, in response to receiving the validated entity or candidate, displays information corresponding to the validated entity or candidate provided by either of the data services in the remote NLP processing case or the candidate/predicate processor 507 in the local NLP processing case. In an example, the context tool UI 508 may present a list of actions for performance 510 with respect to the validated entity or candidate. Accordingly, rather than being presented with a large list of potential actions that may be performed, where many may be irrelevant to the user, a more targeted list of actions available for selection by the user may be presented. Upon selection of an action by the user among the list of actions for performance 510, a processor may execute the selected action. In an example, the list of actions for selection may include, without limitation, an inquiry type action, an execution type action, a request for quote (RFQ) type of action, which may specify order details and/or interest in the validated entity or candidate. Further, actions or data fields that may be incompatible with the validated entity or candidate may not be presented to the user. Accordingly, memory utilization may be improved by allocating memory for field values that may be relevant to the validated entity or candidate.

Further, the context tool UI 508 may receive user selection/user interaction 509 information for updating information and/or options/actions provided on the context tool UI 508. For example, the context tool UI 508 may monitor and capture user actions or selections with other applications on a terminal operated by the user. The context tool UI 508 may also capture user actions or selections with respect to the context tool UI 508. Based on the monitored or captured user actions or selections, the context tool UI 508 may provide a more refined set of information or options/actions for user selection and execution by the context tool.

Further, upon receiving information pertaining to the user selection/user interaction 509, one or more of the actions for performance 510 corresponding to the user selection or input may be performed. In an example, the user selection/user interaction 509 may provide payload of at least one of an inquiry, instrument, or a contact, for performing one or more of the actions for performance 510.

Additionally, the user selection/user interaction 509 information may be transmitted to Interop layer or processor 511. In an example, the user selection/user interaction 509 may provide payload of at least one of an inquiry, instrument, or a contact, to the interop layer or processor 511. More specifically, the interop layer or processor 511 may execute a FDC3 standard protocol, such that the context tool communicates with other applications on the user's desktop to provide contextually relevant information discovered as a result of evaluation of the original input. Based on the outputs provided by the context tool and/or based on interaction with other application(s), a new idea path may be generated based on aggregated information from various sources. Details of the Interop flow is exemplarily described in more detail in FIG. 7 provided below.

Figure 6:
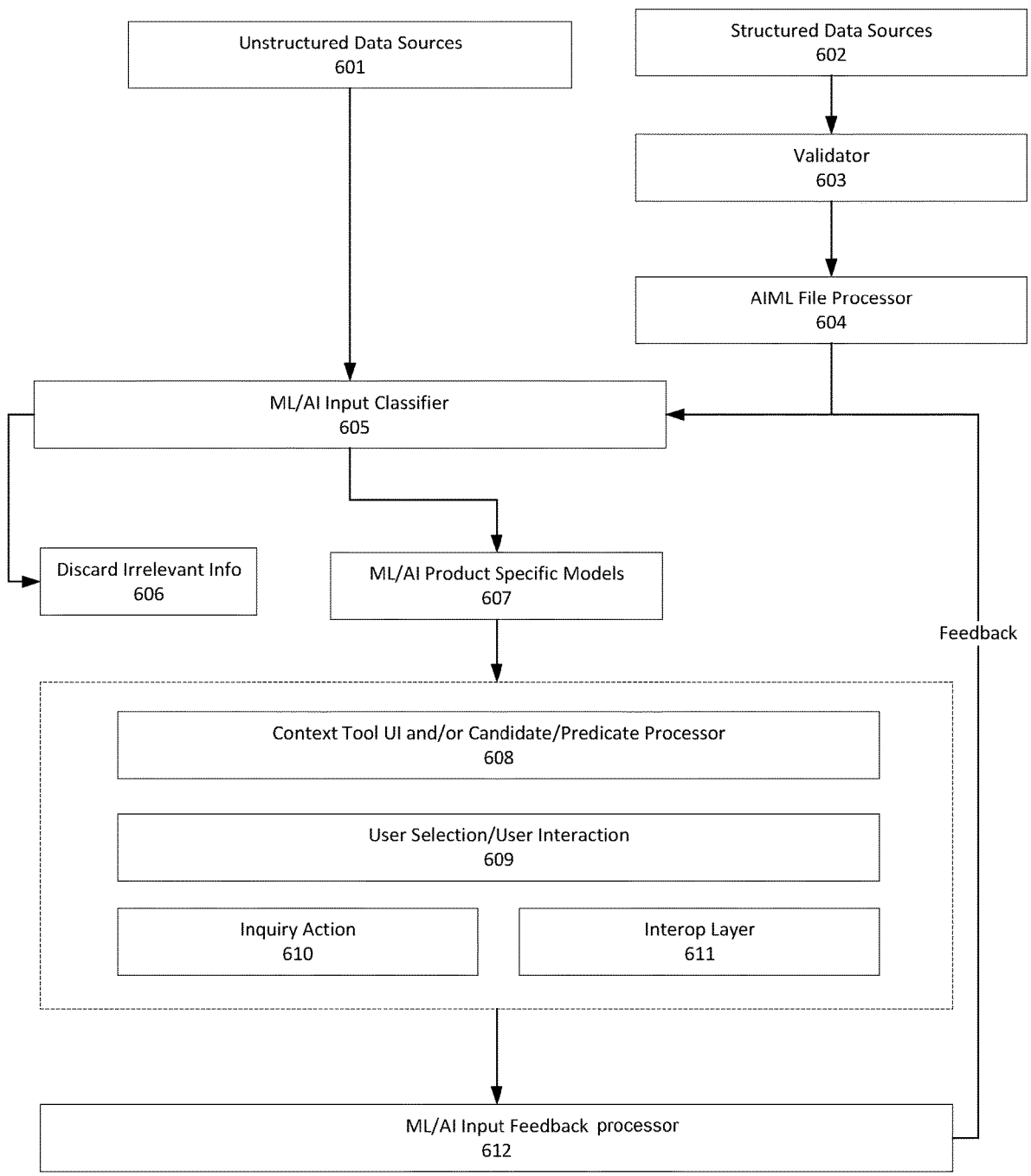
FIG. 6 illustrates a process flow for providing feedback based classification in accordance with an exemplary embodiment.

FIG. 6 illustrates a process flow for providing feedback based classification in accordance with an exemplary embodiment.

Unstructured data sources 601 may include a system clipboard, chat bots, a fast field, a cloud-based data input, and the like. In an example, unstructured data may include text in a form of a written conversation between multiple parties in a chat or messaging application. However, aspects of the present disclosure are not limited thereto, such that the unstructured text may additionally include verbal conversations that may be automatically transcribed in a text form. The unstructured data sources 601 may feed unstructured data to an ML/AI input classifier 605 for classification of the unstructured data and to discard irrelevant information.

The structured data sources 602 include formulaic inputs, which may be provided in a single line of text, or as tabular data in a form of a spreadsheet. In an example, the structured data may be provided in parallel with the unstructured data or independently from the unstructured data. The structured data sources 602 provides structured data to the validator 603.

The validator 603 may perform validation on the structured data received from the structured data sources 602. In an example, the validations performed by the validator 603 may include, without limitation, a validation of file type, file size and other attributes. Validations maybe performed on the structured data to ensure the structured data have been loaded/acquired properly, and to ensure that the data is accurate before further analysis or processing is performed on the data. The structured data may then encoded to, for example, represent binary data in an ASCII string format. Further, the initially validated structured data may be processed to generate file content in the structured data in Base64. The processed structured data is then sent to an AIML (artificial intelligence and machine learning) file processor 604.

The AIML file processor 604 may apply AIML to the validated structured data to, for example, identify relevant data and extraneous data. Further, AIML may also identify a target subject(s) or idea(s) included in the validated data. The AIML file processor 604 may then provide the processed data to the ML/AI input classifier 605 for classification of the provided data.

The ML/AI input classifier 605 may apply ML/AI algorithms to identify irrelevant information 606 from the received data for discarding and classify the remaining data into one or more of various data classifications. For example, data may be classified as one of a product, strategy, asset class, operation and the like. However, aspects of the present disclosure are not limited thereto, such that the data may be classified in different classifications.

Based on the data classification, one or more of available ML/AI product specific models 607 may be applied to the classified data. In an example, the ML/AI product specific models 607 may be updated as additional data is acquired and one or more models may be added to or removed from the stored the ML/AI product specific models 607.

The data processed by the ML/AI product specific models 607 may then be transmitted to the context tool system. A context tool UI and/or candidate/predicate processor 608 of the context tool system may process the received data for identification of one or more candidates and to provide corresponding information and options for selection. In an example, if a single candidate is identified as a match by the candidate/predicate processor, the context tool UI may provide various information and options for selection for the candidate. For example, if product A is identified as a validated candidate, then information and options corresponding to the product A may be provided for display and selection. Likewise, if product B is identified as a validated candidate, then information and options corresponding to product B may be provided for display and selection.

If multiple candidates are identified by the candidate/predicate processor, then input may be obtained from user selection/user interaction 609 to identify a single candidate, for providing corresponding information and options for selection on the context tool UI.

Although the above noted disclosure exemplarily provides identifying a single candidate prior to providing of information and options for selection, aspects of the present disclosure are not limited thereto, such that multiple candidates may be matched and provided with corresponding information and options for section in separate sections of the context tool UI.

Further to the above, the context tool UI or candidate/predicate processor 608 may update information and options for selection provided thereon based on user selection/user interaction 609. Based on the provided user selection or user interaction on the context tool UI, one of actions for performance, such as inquiry action 610 may be executed. Further, interop layer or processor 611 may process the provided information for updating corresponding applications.

Based on the user selections and/or user interactions 609 provided in the context tool and the resulting action performed, ML/AI input feedback processor 613 may process the accuracy of the previous ML/AI provided candidate, and provide feedback information to the ML/AI input classifier 605 for updating of the ML/AI algorithms or engines for classification and/or ML/AI product specific models 607, so that a more accurate result may be provided in a subsequent iteration. For example, the ML/AI input feedback processor 613 may determine or track an amount of user interactions conducted with the user before user selection of the action is received, and provide feedback on accuracy of the natural language processing based on the amount of user interactions performed. Further, the feedback information may further update a relationship information between the provided inputs, the candidate object and/or the action selected.

FIG. 7 illustrates an interop process flow in accordance with an exemplary embodiment.

Interop/Abstraction layer 702 may communicate with an app container 701 and contextual tool UI 703. According to exemplary aspects of the present disclosure, an intent object and a context object acquired from the context tool UI 703 may be registered with the app container 701. More specifically, supported intent objects may be registered, and available intent objects and context objects may be requested to be updated in the app container 701. The app container 701 may transmit a list of all available intents per entity type and target app, and transmit a list of all available contexts objects per entity type.

In an example, an abstraction layer may hide working details of a subsystem to facilitate interoperability. Further, an interop or interoperability layer may provide a single point of entry, which may allow requests or information to be logged and routed to other applications on a system. The interop/abstraction layer 702 may execute a FDC3 standard protocol, such that the context tool UI 703 may communicate, via the interop/abstraction layer 702, with other app containers 701 on the user's desktop or terminal to provide contextually relevant information discovered as a result of evaluation of the original inputs, both structured and unstructured, into the context tool.

The context tool UI 703 may also communication with other portions of the context tool that performs or obtains detection/validation/user interaction 704 signals. Based on the communication between these two components, one or more interop actions may be performed for the detected or validated candidate via user interaction. For example, action 1, action 2, and up to action N may be performed, where N is an integer. The interop actions may include, without limitation, an inquiry action, an instrument action, and a contact action. Although three actions were exemplarily provided above, aspects of the present disclosure are not limited thereto, such that less or more actions may be available for performance or execution.

According to exemplary aspects of the present disclosure, in the inquiry action, an inquiry intent action may be initiated from the app container 701 to provide a list of available inquiry specific intents/context for a given user environment. The list of available inquiry specific intents/context may be based on availability of interop enabled applications for the given user. In an example, the inquiry intent action may include creating a new request for quote for a target product for the detected inquiry.

According to exemplary aspects of the present disclosure, in the instrument action, an instrument intent action may be initiated from the app container 701 to provide a list of available instrument specific intents/context for a given user environment. The list of available instrument specific intents/context may be based on availability of Interop enabled apps for the given user. In an example, the instrument intent action may include opening a particular webpage for the detected instrument.

According to exemplary aspects of the present disclosure, in the contact action, a contact intent action may be initiated from the app container 701 to provide a list of available contact specific intents/context for a given user environment. The list of available, contact specific intents/context may be based on availability of Interop enabled apps for the given user. In an example, the contact intent action may include updating a particular context object for the detected contact.

Based on one or more actions performed, one or more interop functions may be executed. Interop functions may include a payload function, a context update function, and the like.

According to exemplary aspects, a payload function for an intent action (e.g., inquiry, instrument or contact) may be executed. Payload type specific collection of entity identifying values may be performed in accordance with FDC 3 and JP interop specifications. Intent payload may always have a target application. In an example, a particular web page may be opened for the instrument detected by the context tool based on an execution of the payload function. In another example, an RFQ may be opened for a given Inquiry ID.

According to exemplary aspects, a context update function for a candidate object (e.g., instrument, contact or the like) may be executed. Available contexts provided by the app container 701 may allow the context tool to notify any context listeners by updating context with an entity. Such may indicate an exploratory workflow where context is updated with the detected candidate object (e.g., instruments and/or contact). In an example, a client activity view may be automatically updated with provided candidate object.

Based on the interop functions performed, context tool may communicate with different applications/platforms (e.g., application/platform 1, application/platform 2, up to application/platform N, where N is an integer) to provide corresponding information on the other applications or perform corresponding actions via the other applications. For example, information related to the candidate object may be displayed on a different interop enabled application. In addition, a communication message (e.g., email, web-based message, SMS-based message, system communication message or the like) may be auto generated and/or sent.

Further, based on the outputs provided by the context tool and/or based on interaction with other application(s), a new idea path may be generated based on aggregated information from various sources. More specifically, based on one or more outputs provided by the context tool based on the structured and unstructured data acquired, along with other metadata (e.g., search history, query history, or the like within a predetermined period of time) collected from other interop enabled application, the context tool may perform further analysis via AIML algorithms, to identify an overarching theme or idea path, such as a new trading idea, for entry into a system.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for interpreting structured and unstructured content to facilitate tailored transactions using a context tool, the method comprising:
    acquiring, by a processor and from a plurality of unstructured data sources, unstructured data, the unstructured data including written conversations between multiple parties in a messaging application;
    acquiring, by the processor and from one or more structured data sources different from the plurality of unstructured data sources, structured data, wherein the structured data is acquired in parallel with the unstructured data;
    tokenizing, by the processor, the acquired unstructured data to generate a plurality of tokens;
    performing, by the processor, natural language processing (NLP) on both the structured data and the tokenized unstructured data using a machine learning algorithm and contextualizing aggregation of the structured data and the unstructured data based on the NLP;
    determining a subject of the aggregation of the structured data and the unstructured data based on the contextualizing;
    routing, by the processor and across a network, to a target downstream engine among a plurality of downstream engines based on the determined subject;
    generating, by the machine learning algorithm executed by the processor and using the target downstream engine, an NLP response based on the NLP;
    identifying, by the processor, at least one candidate object based on the generated NLP response; and
    generating, by the processor, a list of actions corresponding to the candidate object.

2. The method according to claim 1, further comprising:
    applying, by the processor, the machine learning algorithm to the unstructured data to separate out relevant information and irrelevant information;
    discarding, by the processor, the irrelevant information;
    classifying, by the machine learning algorithm executed by the processor, the unstructured data;
    selecting a machine learning model, among a plurality of machine learning models, to apply to the classified data based on a context of the classified data; and
    applying the selected learning model to the classified data, wherein the candidate object is identified using the selected machine learning model.

3. The method according to claim 1, further comprising:
    executing, by the processor, an interoperability processing for providing information corresponding to the candidate object on a different application; and
    generating, by the processor and based on information related to the at least one candidate object and metadata provided by the different application, a new idea path for storage in a memory.

4. The method according to claim 1, wherein, when a plurality of candidate objects are identified, performing one or more data services to narrow the plurality of candidate objects to a single candidate object.

5. The method according to claim 4, wherein the one or more data services include at least one of a search operation and a validation operation.

6. The method according to claim 1, wherein, when a plurality of candidate objects are identified, narrowing the plurality of candidate objects to a single candidate object based on an interaction with a user.

7. The method according to claim 1, further comprising:
    performing parsing of the unstructured data to convert strings of data from its original format to a uniform format.

8. The method according to claim 1, wherein the unstructured data sources includes at least one of a system clipboard, a chat bot, a fast field, and a cloud-based data input.

9. The method according to claim 1, further comprising:
    validating, by the processor, the structured data based on size and type.

10. The method according to claim 1, further comprising:
    displaying, on a display, the list of actions corresponding to the candidate object for selection; and
    displaying, on the display, information corresponding to the candidate object.

11. The method according to claim 10, further comprising:
    receiving, by the processor and via a peripheral device, at least one user input; and
    updating at least one of the list of actions or the information corresponding to the candidate object based on the at least one user input received.

12. The method according to claim 1, further comprising:
    receiving, by the processor, a user selection of an action to be performed from the generated list of actions corresponding to the candidate object; and
    executing, by the processor, the selected action.

13. The method according to claim 12, further comprising:
    determining, by the processor, an amount of user interactions conducted with the user before the user selection of the action is received; and
    providing, by the machine learning algorithm executed by the processor, feedback on an accuracy of the natural language processing based on the amount of user interactions conducted.

14. The method according to claim 13, further comprising:
  updating, by the processor, the machine learning algorithm utilized in performing the natural language processing based on the provided feedback.

15. The method according to claim 13, further comprising:
  updating, by the processor, at least one machine learning model based on the provided feedback.

16. The method according to claim 1, wherein the natural language processing is performed locally on a client device.

17. The method according to claim 1, wherein the natural language processing is remotely performed over a cloud network.

18. The method according to claim 1, wherein the list of actions includes at least one of an inquiry action, an execution action, and a request for quote.

19. A system, comprising:
  a processor;
  a memory; and
  a communication circuit,
  wherein the processor is configured to:
  acquire, from a plurality of unstructured data sources, unstructured data, the unstructured data including written conversations between multiple parties in a messaging application;
  acquire, from one or more structured data sources different from the plurality of unstructured data sources, structured data, wherein the structured data is acquired in parallel with the unstructured data;
  tokenizing, by the processor, the acquired unstructured data to generate a plurality of tokens;
  perform natural language processing (NLP) on both the structured data and the tokenized unstructured data using a machine learning algorithm and contextualizing aggregation of the structured data and the unstructured data based on the NLP;
  determining a subject of the aggregation of the structured data and the unstructured data based on the contextualizing;
  routing, by the processor and across a network, to a target downstream engine among a plurality of downstream engines based on the determined subject;
  cause to generate, using the machine learning algorithm and using the target downstream engine, an NLP response based on the NLP;
  identify at least one candidate object based on the generated NLP response; and
  generate a list of actions corresponding to the candidate object.

20. A non-transitory computer readable storage medium that stores a computer program for interpreting structured and unstructured content to facilitate tailored transactions, the computer program, when executed by a processor, causing a system to perform a process comprising:
  acquiring, from a plurality of unstructured data sources, unstructured data, the unstructured data including written conversations between multiple parties in a messaging application;
  acquiring, from one or more structured data sources different from the plurality of unstructured data sources, structured data, wherein the structured data is acquired in parallel with the unstructured data;
  tokenizing, by the processor, the acquired unstructured data to generate a plurality of tokens;
  performing natural language processing (NLP) on both the structured data and the tokenized unstructured data using a machine learning algorithm and contextualizing aggregation of the structured data and the unstructured data based on the NLP;
  determining a subject of the aggregation of the structured data and the unstructured data based on the contextualizing;
  routing, by the processor and across a network, to a target downstream engine among a plurality of downstream engines based on the determined subject;
  causing to generate, using the machine learning algorithm and using the target downstream engine, an NLP response based on the NLP;
  identifying at least one candidate object based on the generated NLP response; and
  generating a list of actions corresponding to the candidate object.

* * * * *